United States Patent Office 2,916,520
Patented Dec. 8, 1959

---

2,916,520

PRODUCTION OF GLYCOL MONOETHERS

Henri Normant, Paris, France, assignor to Societe des Usines Chimiques Rhone-Poulenc, Paris, France, a corporation of France No Drawing. Application July 15, 1957
Serial No. 671,688

Claims priority, application France July 19, 1956

5 Claims. (Cl. 260—611)

This invention relates to the production of glycol monoethers and more particularly to the production of monoethers of primary-tertiary and primary-secondary glycols of the general formula:

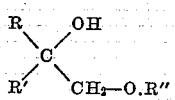

in which R and R'' are saturated or unsaturated aliphatic, isocyclic or heterocyclic radicals and R' is a hydrogen atom or a saturated or unsaturated aliphatic isocyclic or heterocyclic radical, or R and R' form with the carbon atom to which they are attached a cyclic radical.

It is known to prepare primary-tertiary monoethyl ethers of this type by reacting organo-magnesium compounds with ethyl ethoxy acetate, the reaction apparently taking the following course:

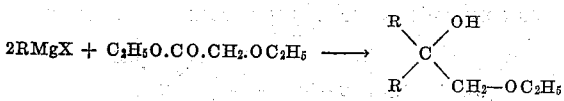

This method however is only applicable to ethers of glycols in which the two radicals R and R' are identical.

It has also been proposed to condense organo-magnesium compounds with ethoxy ketones, the reaction proceeding as follows:

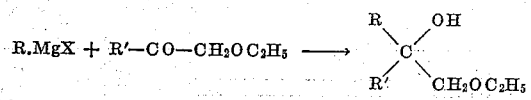

This method enables glycol ethers to be obtained in which the radicals R and R' are different, but it requires ethoxy ketones as starting materials and the preparation of these is complicated.

Sommelet, Annales de Chimie (8), 9, 531 (1906), and German Patent No. 180,202, has proposed the preparation of primary-tertiary glycol ethers by reacting chloromethyl ethers with ketones in the presence of magnesium in a medium of ethyl ether according to the reaction:

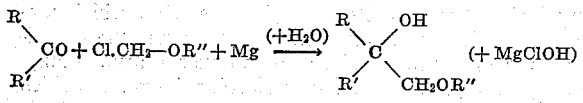

However, it has only been possible in this method to use higher ketones e.g. those in the series methyl hexyl ketone to methyl decyl ketone, i.e. ketones in which R is a long-chain alkyl group and R' is a methyl group, with yields from 16 to 58%. With the lower ketones, such as acetone, the author indicates that the yields are even smaller and that he has not been able to obtain pure glycol ethers. Moreover, the author indicates that the method has not been successful with aromatic ketones, such as acetophenone and that though the method has been applied to aldehydes, it proved without success.

It has now been found that the reaction of chloromethyl ethers with ketones in the presence of magnesium may be carried out to afford excellent yields if the medium of ethyl ether is replaced by a cyclic ether such as tetrahydrofuran, tetrahydropyran and homologues thereof. Under these working conditions the method is applicable generally to all the ketones of the R—CO—R' type, in which R and R' can be alkyl or aryl groups or form a ring with the CO group.

It has also been found that, using the same cyclic ethers, the condensation of chloromethyl ether can also be carried out with aldehydes (R'=H) with formation of the corresponding primary-secondary glycol ethers, according to the reaction:

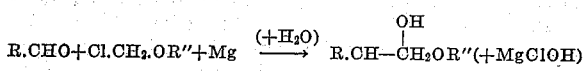

According to the present invention, therefore, there is provided a process for the production of glycol ethers of the general formula:

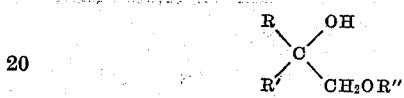

where R and R' taken separately are in the case of R a saturated or unsaturated aliphatic, hydrocarbon radical, or a mononuclear aryl, aralkyl or cycloalkyl radical and in the case of R' a hydrogen atom or a saturated or unsaturated aliphatic, hydrocarbon radical, or a mononuclear aryl, aralkyl or cycloalkyl radical and taken together form with the carbon atom to which they are attached a cyclic nucleus, and R'' is a saturated or unsaturated aliphatic, hydrocarbon radical, or a mononuclear aryl, aralkyl or cycloalkyl radical, which comprises reacting a compound of the general formula R—CO—R' with a chloromethyl ether of the formula ClCH₂OR'' in the presence of magnesium in a medium of a cyclic ether, decomposing the magnesium compound formed and isolating the glycol ether thus produced.

Within the scope of the foregoing statement of the invention the process is preferably applied to the production of compounds in which R is an alkyl group containing up to 12 carbon atoms or a corresponding ethylenically unsaturated group, or a saturated cycloalkyl radical with a five or six carbon ring, and R' is a hydrogen atom or any of the foregoing types of group, or wherein R and R' are jointly with the carbon atom to which they are attached a benzene ring or a corresponding more saturated ring, and R'' is any of the groups referred to above, and these possibilities represent a preferred sub-group of compounds according to the invention.

The glycol ethers obtained by the present invention are very valuable organic intermediates because they can easily be transformed into aldehydes by the action of acids according to the reaction mechanism:

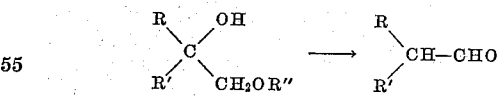

The process of the present invention thus renders it possible for aldehydes with n+1 carbon atoms to be obtained from ketones or aldehydes having n carbon atoms by the intermediate formation of glycol ethers. It is to be noted that in applying the process of the invention to the aldehydes of the formula R—CH=CH—CHO and in subjecting the glycol ether obtained to the action of an acid, aldehydes of the formula

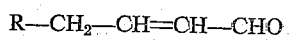

are obtained because of a migration of the double bond.
In the chloromethyl ethers of the formula

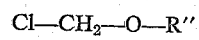

used as starting materials R'' can be a methyl, ethyl or higher homologous group, or aryl. If the glycol ethers are to serve for the preparation of aldehydes, it is preferred to use chloromethyl methyl ethers and chloromethyl ethyl ethers. The chloromethyl ethers are very easy to prepare by the reaction of formaldehyde, hydrochloric acid and an alcohol.

Ketones used as starting materials are of the formula R—CO—R'. Suitable compounds are those in which:

(1) R' is a methyl radical and R is a saturated or unsaturated aliphatic radical. Examples are acetone, methyl ethyl ketone, methyl propyl ketone, methyl butyl ketone, methyl isobutyl ketone, methyl amyl ketone and higher ketones and unsaturated ketones such as mesityl oxide and methyl heptenone.

(2) R' is a methyl radical and R an aryl radical, a saturated or unsaturated aryl-aliphatic radical or a saturated or unsaturated cycloaliphatic radical. Examples are acetophenone, benzyl acetone, benzylidene acetone, p-isopropylacetophenone and β-ionone.

(3) R' is a radical other than methyl and R is an aliphatic or cyclic radical. Examples are diethyl ketone, ethyl propyl ketone, ethyl butyl ketone, diisobutyl ketone, benzophenone and phenyl cyclopropyl ketone.

(4) R and R' form a ring with the CO group. Examples are cyclohexanone and homologues thereof.

Aldehydes (R'=H) used as starting materials may be saturated or unsaturated aliphatic, aromatic, or heterocyclic aldehydes. Particularly suitable aliphatic aldehydes are the higher aldehydes comprising 5 to 12 carbon atoms, unsaturated aldehydes such as acrolein, crotonal and pentenal, aromatic aldehydes such as benzaldehyde and its homologues, hydroxy aldehydes such as veratraldehyde and piperonal, and heterocyclic aldehydes such as furfural.

The reaction is carried out by bringing the chloromethyl ether and the ketone or aldehyde into contact with magnesium, preferably activated by mercuric chloride, in the presence of a cyclic ether such as tetrahydrofuran, tetrahydropyran or a homologue thereof.

The transformation of the ethers obtained into aldehydes can be carried out by the conventional methods: treatment with sulphuric acid, p-toluene sulphonic acid, formic acid or oxalic acid.

The following examples will serve to illustrate the invention.

EXAMPLES 9.72 g. of magnesium are placed in a flask and covered with dry tetrahydrofuran. 0.5 g. of mercuric chloride is added and the mixture stirred for 2 minutes.

From an ampoule containing 38 g. of freshly distilled chloromethyl ethyl ether free from hydrochloric acid, diluted with 2 volumes of dry tetrahydrofuran, 10 to 15 cc. are poured into the flask and stirred. As soon as the reaction has started, the flask is immersed in an ice bath. The remainder of the chloromethyl ether solution is then added dropwise and there is added, at the same titme, from another ampoule, 35 g. of amyl methyl ketone diluted with an equal volume of tetrahydrofuran, so that the additions are finished at the same time. The mixture is left to stand, and then decomposed, while still in the ice bath, by a cold saturated solution of ammonium chloride. The aqueous layer is then decanted and extracted with ether. The ethereal extract is added to the organic phase and the whole is dried over sodium sulphate. The solvents are driven off and the residue distilled over reduced pressure (12 mm. of mercury). 48 g. of 1-ethoxy-2-methyl-2 heptanol are obtained, boiling between 87 and 90° C.

The middle fraction, which boils at 87° C./11 mm. Hg, has the following constants: $n_D^{19}=1.4281$; $d_4^{19}=0.866$.

By treating the ethoxy methyl heptanol with formic acid, 2-methyl heptanal is obtained in a yield of 71%, this substance boiling at 51° C./11 mm. Hg.

The general process just described, applied to a series of aldehydes and ketones gives the results indicated in the following tables, which shows the yield of the relevant glycol ether and its boiling point at the pressure indicated.

Table I

CONDENSATION WITH CHLOROMETHYL ETHYL ETHER

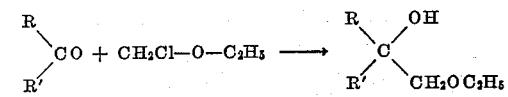

| Initial materials | Glycol ether | |
|---|---|---|
| | Yield, Percent | B.P., ° C./ pressure, mm. Hg |
| Acetone | 70 | 128/764 |
| Methyl ethyl ketone | 76 | 48/14 |
| Methyl isobutyl ketone | 87 | 65/12 |
| Methyl amyl ketone | 93 | 87/11 |
| Methyl isobutenyl ketone | 50 | 66/10 |
| Methyl heptenone | 85 | 102/12 |
| Acetophenone | 55 | 109/11 |
| Benzyl methyl ketone | 70 | 130/16 |
| Benzylidene acetone | 50 | 112-114/0.5 |
| Isopropyl acetophenone | 70 | 104/0.5 |
| β-Ionone | 76 | 111-112/0.7 |
| p-Isopropyl benzyl methyl ketone | 87 | 109-111/0.4 |
| Diisobutyl ketone | 45 | 103/17 |
| Cyclopropyl phenyl ketone | 60 | 128-132/11 |
| Benzophenone | 72 | 126/0.5 |
| Cyclohexanone | 76 | 88/12 |
| Heptanal | 68 | 103/11 |
| Acrolein | 30 | 51/13 |
| Crotonal | 46 | 64/10 |
| Pentene-2-al | 70 | 85/15 |
| Benzaldehyde | 88 | 120-122/12 |
| Veratraldehyde | 82 | 137-140/0.3 |
| Piperonal | 80 | 125/0.4 |

Table II

CONDENSATION WITH CHLOROMETHYL METHYL ETHER

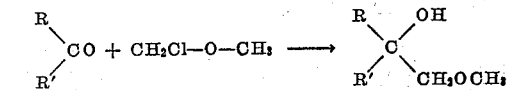

| Initial materials | Glycol ether | |
|---|---|---|
| | Yield, Percent | B.P., ° C./ pressure, mm. Hg |
| Methyl isobutyl ketone | 52 | 48/12 |
| Ethyl butyl ketone | 75 | 84/10 |

I claim:

1. A process for the production of a glycol ether of the general formula

in which R and R' are selected from the class which consists of hydrogen atoms, saturated and unsaturated aliphatic hydrocarbon radicals, mononuclear aryl, aralkyl and cycloalkyl radicals, and molecular fragments which with the adjacent carbon atom complete a cycloaliphatic ring, at most one of the two being hydrogen, and R" is selected from the class which consists of saturated and unsaturated aliphatic hydrocarbon radicals and mononuclear aryl, aralkyl and cycloalkyl radicals, which comprises reacting a compound of the general formula R.CO.R' with a chloromethyl ether of the general formula ClCH₂OR" in the presence of magnesium in a medium of a cyclic ether selected from the group which consists of tetrahydrofuran, and tetrahydropyran, hydrolysing the magnesium compound formed, and isolating the glycol ether thus produced.

2. A process according to claim 1, which comprises isolating the glycol ether by solvent extraction.

3. A process according to claim 1, which comprises carrying out the reaction in the presence of magnesium activated by mercuric chloride.

4. A process according to claim 1, which comprises carrying out the reaction in a medium of tetrahydrofuran.

5. A process according to claim 4, which comprises carrying out the reaction in the presence of magnesium activated with mercuric chloride.

References Cited in the file of this patent

UNITED STATES PATENTS 2,422,956   Elderfield et al. _____ June 24, 1947

FOREIGN PATENTS 180,202   Germany _____ Jan. 16, 1907

OTHER REFERENCES

Sommelet.: Annales de Chimie et de Physique, 8ᴱ Ser., vol. 9, pp. 531–536 (1906).

Cherbuliez et al.: Helvetica Chimica Acta, vol. 26, pp. 2251–2252 (1943).

Elderfield et al.: J. Am. Chem. Soc., vol. 72, pp. 1334–1345, March 1950.

Kharasch et al: Grignard Reactions of Nonmetallic Substances, Prentice-Hall, New York, pp. 24 and 49 (1954).